(No Model.) 3 Sheets—Sheet 1.

H. M. MYERS.
METHOD OF AND MEANS FOR MAKING SHOVELS.

No. 353,372. Patented Nov. 30, 1886

Witnesses
Fred G. Dieterich
James L. Johnston

Inventor
Henry M. Myers
By his Attorneys
Johnston, Reinohl & Dye

N. PETERS, Photo-Lithographer, Washington, D. C.

(No Model.) 3 Sheets—Sheet 2.
H. M. MYERS.
METHOD OF AND MEANS FOR MAKING SHOVELS.
No. 353,372. Patented Nov. 30, 1886.
Fig. 4.
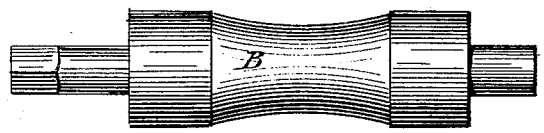
Fig. 5. Fig. 6.
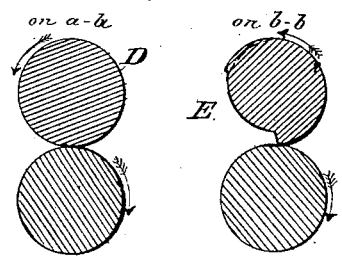 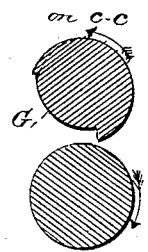
Fig. 7
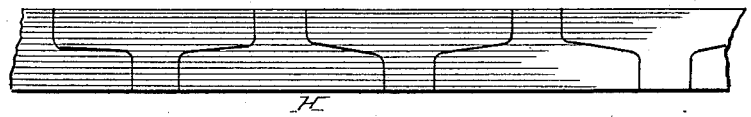
Fig. 8 Fig. 9
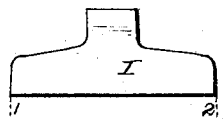 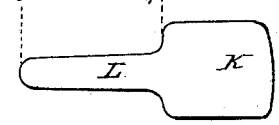
Fig. 10.
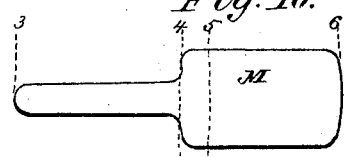
Witnesses
Fred G. Dieterich
James J. Johnston
Inventor
Henry M. Myers
By his Attorneys
Johnston, Reinohl & Dye (No Model.) 3 Sheets—Sheet 3.
H. M. MYERS.
METHOD OF AND MEANS FOR MAKING SHOVELS.
No. 353,372. Patented Nov. 30, 1886.
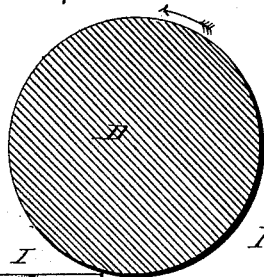
Fig. 11.
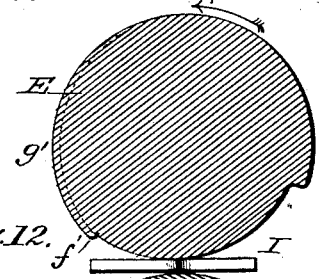
Fig. 12.
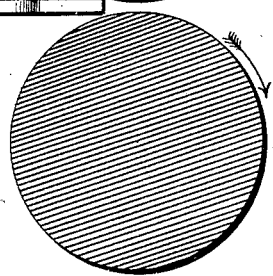
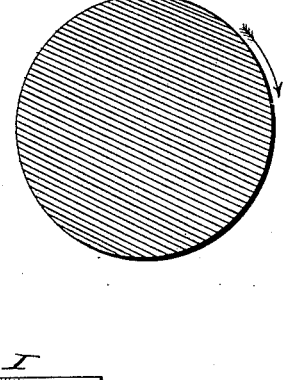
Fig. 13.
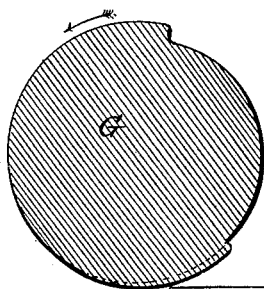
Fig. 15.
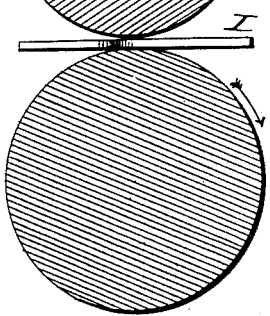
Fig. 14.
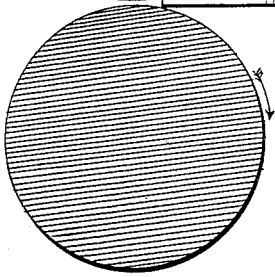
Witnesses
Fred G. Dieterich
Wm. E. Dyne
Inventor
Henry M. Myers
By his Attorneys
Johnston, Reinohl & Dyne

UNITED STATES PATENT OFFICE.

HENRY MILTON MYERS, OF BEAVER FALLS, PENNSYLVANIA.

METHOD OF AND MEANS FOR MAKING SHOVELS.

SPECIFICATION forming part of Letters Patent No. 353,372, dated November 30, 1886.

Application filed May 26, 1886. Serial No. 203,312. (No model.)

*To all whom it may concern:*

Be it known that I, HENRY MILTON MYERS, a citizen of the United States, residing at Beaver Falls, in the county of Beaver and State of Pennsylvania, have invented certain new and useful Improvements in Methods of and Means for Making Shovels; and I do hereby declare the following to be a full, clear, and exact description of the invention, such as will enable others skilled in the art to which it appertains to make and use the same.

The invention relates to the art of making shovels, spades, and scoops, and has for its object an improvement on my Patents Nos. 340,597 to 340,601, and also No. 340,606, of April 27, 1886.

The invention will be hereinafter fully described, and particularly pointed out in the claims.

Figure 1:
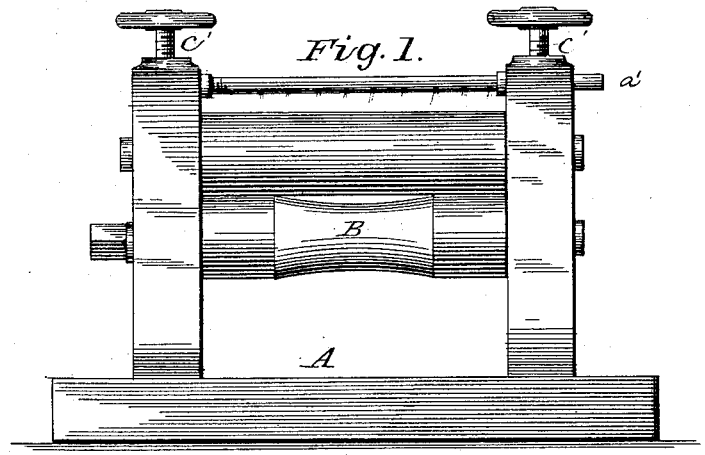
Figure 2:
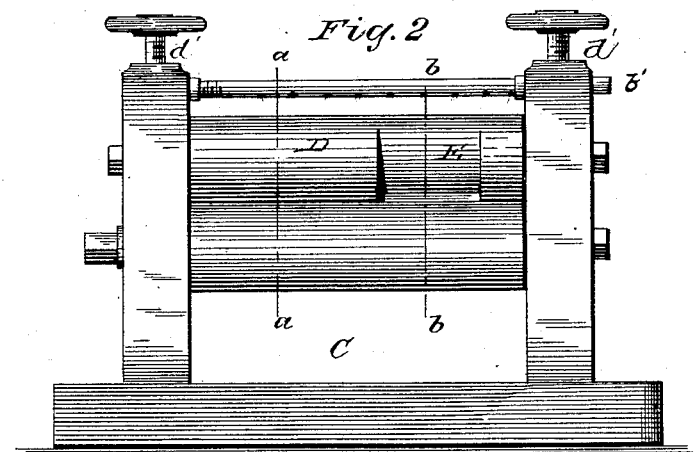
Figure 3:
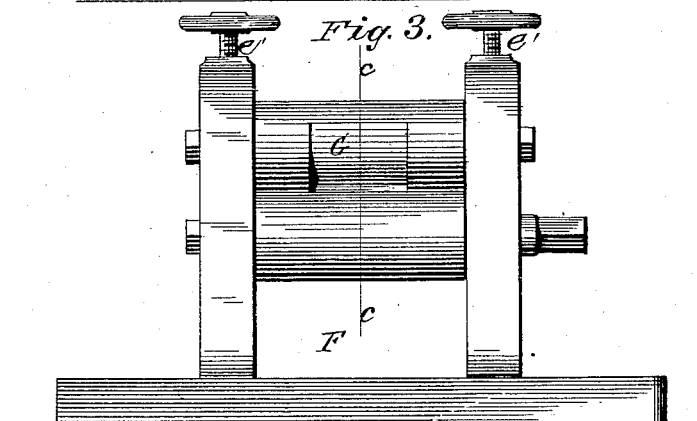

In the accompanying drawings, which form a part of this specification, Figure 1 represents a front elevation of the first rolls to which the blank is subjected; Fig. 2, the second rolls; Fig. 3, the third or finishing rolls. Fig. 4 represents the lower roll of the first set; Fig. 5, cross-sections on the lines $a\,a$ and $b\,b$ of Fig. 2; Fig. 6, a cross-section on the line $c\,c$ of Fig. 3. Fig. 7 represents a bar from which the blanks are cut; Fig. 8, a blank before rolling; Fig. 9, a partially-rolled blank on a reduced scale; and Fig. 10, a finished blank, on a reduced scale, ready for the shearing process. Figs. 11, 12, and 13 are enlarged cross-sectional views of the second set of rolls on the lines $a\,a$ and $b\,b$ of Fig. 2; and Figs. 14 and 15 are similar views of the third set of rolls on the line $c\,c$ of Fig. 3.

Reference being had to the drawings and the letters marked thereon, A represents the first or "breaking-down rolls," in which the upper roll is a plain cylinder, and the lower roll is cut away at B.

C represents the second rolls, in which the lower roll is a plain cylinder, and the upper roll is formed of a plain surface, D, and an eccentric portion, E.

F represents the third or finishing and pointing rolls, in which the lower roll is also a plain cylinder, and the upper roll is provided with an eccentric portion, G.

H represents a bar of metal from which blanks I (shown in Fig. 8) are cut by a suitable machine.

K represents a blank with the blade drawn out about two-thirds ($\frac{2}{3}$) of its length, and the handle-straps L drawn out their full length.

M represents a blank drawn out to its full length and ready for the shearing or trimming process.

The first and second pair of rolls are provided with finely-perforated pipes $a\,b$, for distributing water upon the upper rolls.

The operation is as follows: The bar H is heated in a suitable furnace and cut into blanks I by a machine for the purpose. The tang of the blank is then split in a splitting-machine, such as is shown in my application No. 160,241, filed March 27, 1885, for forming the socket and the handle-straps. A little cinder is inserted in the socket and between the split portions of the tang to prevent their welding, and they are partially closed together by the same machine. The upper roll of the first pair is raised about one-half ($\frac{1}{2}$) of an inch from the lower roll by means of weights in the roll-pit, (not shown,) the screws $c'\,c'$ having been run up to allow the blank to make its first passage, whereby it is reduced about one-eighth ($\frac{1}{8}$) of an inch. The blank is then passed through the first rolls, A, twice, tang foremost, while the upper roll is kept wet with water running in fine streams from the pipe $a$. After the first passage of the blank through the rolls, the roller runs down the screws $c'\,c'$ simultaneously by means of a wheel, they being connected together, as is the common practice in rolling metals, and therefore not illustrated on the drawings. The "catcher" then passes the blank to the roller at the second rolls, C, who passes the partially-rolled blank between the rolls at D twice, tang foremost, and once blade foremost, as shown in Fig. 11. The screws $d'\,d'$ in this pair of rolls are manipulated as in the first pair. At this stage in the operation the blade has been drawn out to about two-thirds ($\frac{2}{3}$) of its length, as shown at K in Fig. 9. After leaving the second rolls at D the blank is taken by the catcher and inserted in the eccentric portion E of the same rolls, and the tang drawn out to its desired length, width, and thickness, as shown between the lines 3 and 4 in said Figs. 9 and 10. In the eccentric portion of the rolls the blank is entered tang foremost, as shown in Fig. 12, and delivered on the same side that it was entered, or toward the workman, as shown in Fig. 13. In this operation the catcher enters the blank through the pass E, and the point $f'$ on the roll striking the blank I at the junction of the blade and the handle-straps, reduces the latter in thickness as the swell $g'$ on the roll passes over said straps. In this pair of rolls the upper roll is also kept wet through the medium of the pipe $b'$, and the blank, after leaving the rolls, is smooth and almost free from scale, which greatly facilitates the pickling process, lessens the quantity of acid required for removing the scale, and in the manufacture of polished shovels the labor incident to polishing is greatly reduced, while in the production of what are known to the trade as "black shovels" or "unpolished shovels," an article having a very smooth surface and fine finish is presented at a reduction in the cost of making.

In the manufacture of polished shovels the partly-rolled blank, after leaving the second pair of rolls, is cooled and subjected to the acid bath or pickling process for removing the scale therefrom. After the scale has been removed the blank is heated to a "cherry-red" heat and passed into the third or finishing and pointing rolls F, point of blade foremost, and drawn out to its full length, and pointed from the line 5 to 6, Fig. 10. In these last or finishing and pointing rolls the rolls, with their screws $e'$ $e'$, are manipulated as in the former two sets of rolls, and the blank is also delivered toward the workman, as in the eccentric portion of the second rolls, as shown in Figs. 14 and 15. The blank is now ready for the shearing or trimming process, by which the rough edges are cut off and the blade reduced to its finished dimensions. From this point the blade is polished or finished in the usual manner.

In rolling the blank its width from the lines 1 to 2 is not increased more than one-eighth ($\frac{1}{8}$) of an inch, and, by preference, the blade and handle-straps are rolled one gage thicker in the center throughout their entire length than at the edges, gradually tapering toward the side edges thereof. By thickening the metal in the center of the shovel the blade will wear evenly at the point and prevent the handle-straps from cupping in the operation of riveting them to the wooden handle.

In the manufacture of black shovels the pickling process is omitted and the blank conducted from the second rolls to a furnace, where it is heated to a cherry-red heat and passed to the finishing and pointing rolls.

By the process described the blade, when it leaves the last rolls, is free from scale and presents a perfectly-smooth surface having a delicate oxidized coating, which requires very little labor to polish, and as the thickness of the blade and the handle-straps is gaged in the second rolls all of the shovels made will be of exactly the same thickness.

Instead of commencing the operation with a bar of metal and cutting blanks therefrom, I may commence with the blank shown in Fig. 8 as an article of manufacture, as claimed in my Patent No. 340,603, heat it, and conduct it through the various steps enumerated in the operation before described.

The water falling on the upper roll of the first two sets serves not only to produce a much smoother shovel than has heretofore been supplied to the trade, but it serves to keep the rolls cool, thereby increasing their durability, causing them to retain their smooth surface longer, and reducing the strain upon them and their liability to expansion under the heat of the metal.

I am aware that it is not new to sprinkle water on rolls used for rolling heavy bars and plate metal, but in such instances the only object sought after was to keep down the temperature of the rolls. My primary object is to affect the quality of the work done, or to produce a shovel-blade comparatively free from scale. By this change in the manipulation of a shovel-blank, as compared with the processes set forth in my patents hereinbefore referred to, I am enabled to dispense with two workmen, while I secure as a result a product from the rolls, a shovel-blade that can be polished at a great reduction in the cost of manufacture.

Having thus fully described my invention, what I claim is—

1. The improvement in the art of making shovels to the shearing-point hereinbefore described, which consists in heating a bar of metal and cutting blanks therefrom, splitting the tang of the blank and forming the socket for the handle, partly reducing the blank and rolling out the tang to its proper dimensions for the handle-straps between wet rolls, and completing the rolling and pointing the blade between dry rolls, substantially as described.

2. The improvement in the art of making shovels to the shearing-point hereinbefore described, which consists in heating a blank, splitting the tang and forming the socket for the handle, partly reducing the blank and rolling out the tang to its proper dimensions for the handle-straps between wet rolls, and completing the rolling and pointing the blade between dry rolls, substantially as described.

3. The improvement in the art of making shovels to the shearing-point, which consists in heating a blank, splitting the tang and forming the socket for the handle, partly reducing the blank and rolling out the tang to its proper dimensions for the handle-straps between wet rolls, reheating the blank, and completing the rolling and pointing the blade between dry rolls, substantially as described.

4. The improvement in the art of making shovels to the shearing-point hereinbefore described, which consists in heating a bar of metal and cutting blanks therefrom, splitting the tang of the blank and forming the socket for the handle, partly reducing the blank and rolling out the tang to the proper dimensions for the handle-straps between wet rolls, then pickling the blank, reheating the same, completing the rolling and pointing the blade between dry rolls, substantially as described.

5. The improvement in the art of making shovels to the shearing-point hereinbefore described, which consists in heating a blank, splitting the tang, and forming the socket for the handle, partly reducing the blank and rolling out the tang to the proper dimensions for the handle-straps between wet rolls, then pickling the blank, reheating the same, completing the rolling and pointing the blade between dry rolls, substantially as set forth.

6. The process of making shovels to the shearing-point, which consists in splitting the tang of a heated blank and forming the socket for the handle, partly reducing the blank by passing it through rolls tang foremost, then through other rolls, first tang foremost then blade foremost, then reducing the tang to proper dimensions for handle-straps, pickling the blank, then reheating the same, and, finally, completing the rolling and pointing of the blade, substantially as described.

7. The improvement in the art of making shovels from heated blanks, which consists in partially reducing the blade and rolling out the tang to its proper dimensions for the handle-straps between wet rolls, and completing the rolling and pointing the blade between dry rolls, substantially as described.

8. The means herein described for reducing shovel-blanks, which consists in the combination of breaking-down rolls, a pair of rolls having a plain surface and an eccentric portion, water-distributing pipes for said rolls, and a third pair of rolls having an eccentric recess in one of the rolls, substantially as described.

In testimony whereof I affix my signature in presence of two witnesses.

HENRY MILTON MYERS.

Witnesses:
CHAS. L. SHEETS,
JOSEPH M. DOUTHETT.